Sept. 6, 1966     G. C. COLLINS     3,271,606
ROTOR ASSEMBLY
Filed Nov. 5, 1962
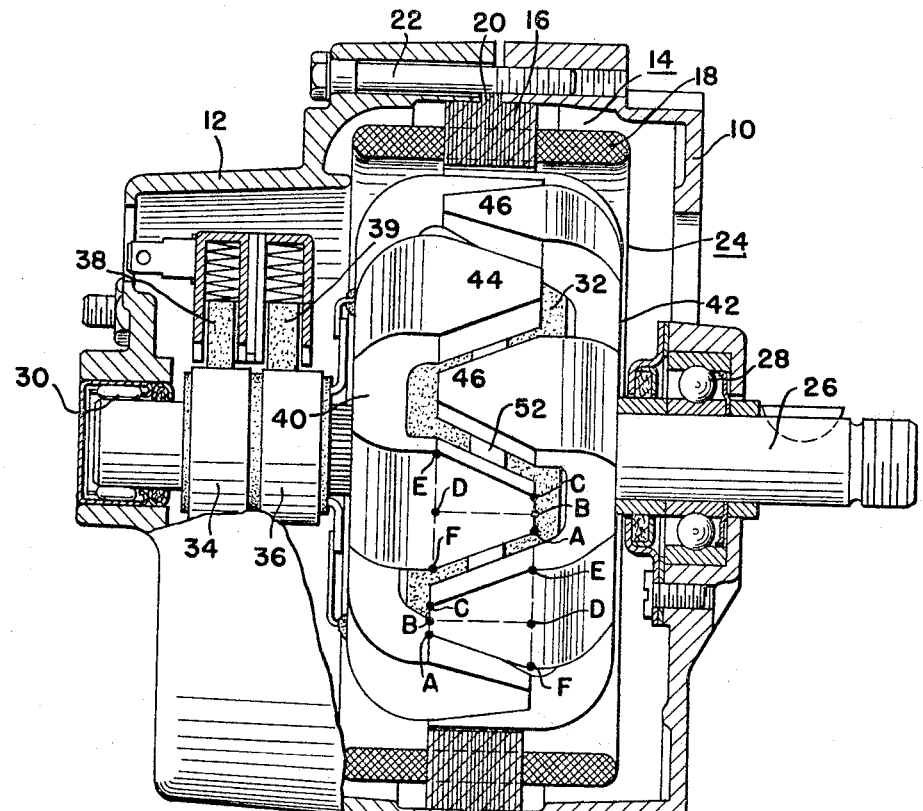
Fig. 1
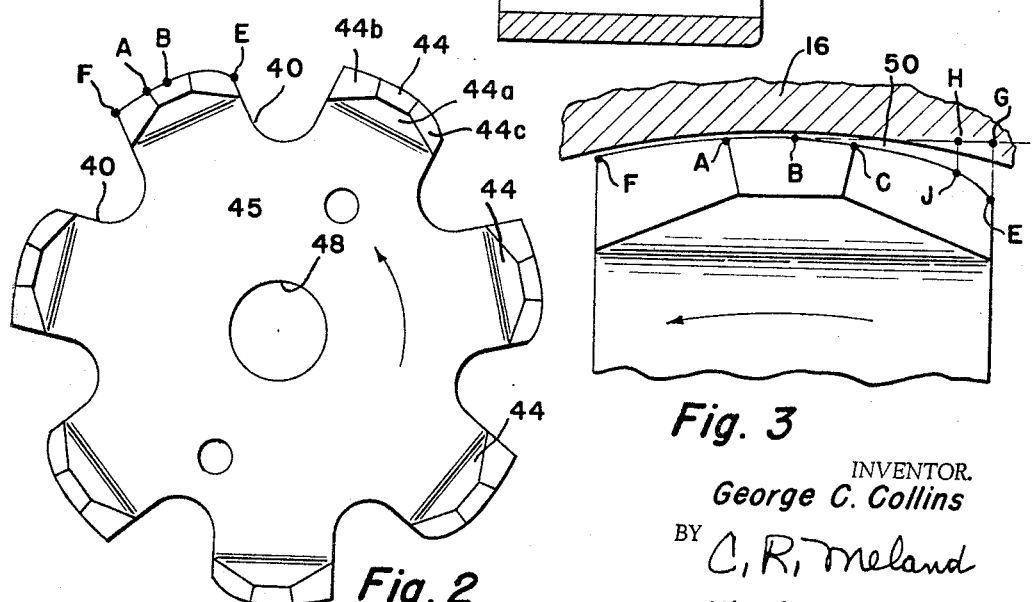
Fig. 2
Fig. 3
INVENTOR.
George C. Collins
BY C. R. Meland
His Attorney

United States Patent Office 3,271,606
Patented Sept. 6, 1966

3,271,606
ROTOR ASSEMBLY
George C. Collins, Pendleton, Ind., assignor to General Motors Corporation, Detroit, Mich., a corporation of Delaware
Filed Nov. 5, 1962, Ser. No. 235,278
5 Claims. (Cl. 310—263)

This invention relates to rotor assemblies for dynamoelectric machines and the like and more particularly to a rotor assembly of a type which is comprised of two rotor segments having interfitting axially extending pole teeth and an energizing field coil for magnetizing the teeth with opposite magnetic polarities.

Dynamoelectric machine rotors of a type having interfitting pole teeth are well known in the art and the present invention resides in an improvement in such a structure whereby magnetic noise can be substantially reduced when the rotor assembly is used in conjunction with a stator assembly for example in an alternating current generator.

It accordingly is one of the objects of this invention to provide a rotor assembly which has a reduced magnetic noise as compared to those heretofore known without appreciable loss in performance.

Another object of this invention is to provide a rotor assembly for a dynamoelectric machine which includes a pair of rotor segments having interfitting pole teeth and wherein the outer surface of the pole teeth are defined by a constant radius curve over the leading half of the teeth but of a non-circular steadily increasing curvature over the trailing edge thereof. With this arrangement, there is a larger air gap between the outer surface of pole teeth and the inner surface of the stator assembly over the trailing half of the teeth than over the leading half. It has been found that with a uniform air gap across the width of the teeth, the flux density is at a maximum at the trailing edge of the teeth when the machine is operating. With the increasing air gap in the trailing half of the teeth provided by this invention, flux density in the trailing half is reduced and magnetic noise generated is decreased over that of machines having a uniform air gap between the outer surfaces of the teeth and the inner surfaces of the stator.

Still another object of this invention is to provide a rotor assembly wherein the outer surfaces of the trailing edges of the pole teeth are reduced nonuniformly such that when the rotor is used with a uniform diameter stator, there is an increasing air gap as one progresses from the middle of the tooth to the trailing edge thereof.

Further objects and advantages of the present invention will be apparent from the following description, reference being had to the accompanying drawings wherein preferred embodiments of the present invention are closely shown.

In the drawings:

FIGURE 1 is a view partly in section of a dynamoelectric machine which is provided with the rotor assembly of this invention.

FIGURE 2 is an end view of one of the rotor segments which forms part of the rotor assembly shown in FIGURE 1.

FIGURE 3 is an enlarged view of one of the pole teeth of the rotor segments shown in FIGURE 2 and illustrating the curvature of the outer surface of the trailing edge of the pole teeth.

Referring now to the drawings and more particularly to FIGURE 1, the reference numerals 10 and 12 designate end frames for a dynamoelectric machine which in this case is an alternating current generator. The end frames 10 and 12 support a stator assembly generally designated by reference numeral 14. The stator assembly includes the laminated stator iron 16 having slots which receive a three phase Y-connected stator winding 18. The laminations 16 may be secured together in any well known manner and have central laminations 20 of larger diameter which are clamped between the end frames 10 and 12 when the through bolts 22 are tightened.

The rotor assembly of this invention is generally designated by reference numeral 24 and includes a shaft 26 which is journalled in bearings 28 and 30 located respectively in end frames 10 and 12. The rotor assembly includes a field coil assembly 32 which has a magnetic core not shown and a coil winding assembly supported thereby. This type of field coil assembly is well known to those skilled in the art and includes a core member formed of magnetic material which is fitted to splines on the shaft 26. The coil winding on the core can be supported by a spool which is formed of insulating material and which embraces the core.

The lead wires for the coil of the coil winding assembly 32 are connected with slip rings 34 and 36 which rotate with the shaft 26. These slip rings 34 and 36 engage brushes 38 and 39 for supplying field current to the field coil of the field assembly 32.

The rotor assembly 24 includes rotor segments 42 and 40 which are secured to the shaft 26 by any well known means. As one example, the shaft may be splined and the central opening of the rotor segments then slipped on to the splines so that the segments rotate with the shaft 26. These splines may be the same splines that engage the internal central opening of the metal core of the field assembly 32.

The rotor segment 40 will be described in detail, it being understood that the shape of teeth of the rotor segment 42 are identical with the teeth of the rotor segment 40. It is seen that there are seven pole teeth 44 on the rotor segment 40 which extend from a base section 45 and which interfit with seven pole teeth 46 on the rotor segment 42. The shapes of pole teeth 44 and 46 are identical and the discussion of their shapes will therefore be limited to a discussion of the shape of pole teeth 44.

It is seen that the pole teeth 44 each has an inner surface 44a which is located at approximately 15° to the longitudinal axis of the rotor segment 40 which passes through the central opening 48 of the segment. In addition, these pole teeth have surfaces 44b and 44c which are tapered inwardly at approximately 13°. In other words, an imaginary diameter drawn through the middle of a pole tooth 44 and a line drawn from the longitudinal axis of the rotor segment 40 and in the plane of surfaces 44c and 44b would make an angle of approximately 13° with the imaginary diameter. It is seen that the surfaces 44b and 44c taper toward each other and therefore define teeth which are generally V-shaped with blunt ends.

The outer surface of the pole teeth 44 is best seen from an inspection of the exploded view of FIGURE 3. This outer surface has two distinct areas or sections defined by points BCED and BAFD. Thus, the outer surface BAFD defines an arcuate surface which is a part of a cylindrical surface whose axis coincides with the longitudinal axis of the rotor segment 40. The surfaces BAFD adjacent all the leading edges of all of the teeth 44 are of a constant radius. It thus can be seen from FIGURE 3 that the air gap between the inner surface of the stator laminations 16 and the outer surface BAFD of the leading edge is substantially constant. It, of course, will be appreciated that the inner surface of the stator iron 16 has slots for receiving the stator coil winding and these are not illustrated in FIGURE 3.

The outer surfaces BCED do not have a constant radius but curve off rather sharply to form an air gap 50 between surfaces BCED and the inner surface of the stator which increases as one goes from point B to point E. It thus is seen that the surfaces BCED which are adjacent the trailing edges of the teeth do not have a constant radius.

By way of example and not by way of limitation, the point E may be located such that the distance between points B and G is .4575 inch when the distance between points G and E is .1270 inch. In this case, the line BG is perpendicular to the line GE to define coordinates in vertical and horizontal axes. In this case, the line BG is drawn tangent to the point B of the rotor segment and a line drawn from point B to the center of the opening 48 would be perpendicular to line BG. Point J, for example, can be located by making BH .3750 inch and HJ .0598 inch. The distance BD may be .770 inch where FE is .915 inch.

It can be seen from the foregoing that the outer surfaces of the trailing edges of the teeth BCED curve in such a direction that an increasing air gap is defined between the outer surfaces BCED of the teeth and the inner surface of the stator iron 16 as one progresses between lines BD and CE. It has been found that this arrangement reduces the magnetic noise encountered in an alternating current generator particularly at low speeds of the generator.

The internal surfaces of the teeth 44 and 46 are engaged by an annular ring 52 which is formed of a non-magnetic material and which also serves in some degree to reduce the noise generated by the generator during its operation.

It is to be understood that the teeth 46 of the rotor segment 42 are identical with the teeth 44 on the rotor segment 40 with the exception that the reduced surfaces BCED are on an opposite side of the teeth as can be seen in FIGURE 1. The rotor segments 40 and 42 are shown positioned for counterclockwise rotation. If clockwise rotation is desired, the two segments would have to be interchanged from their positions shown in FIGURE 1 so that the surface adjacent the trailing edge of the teeth is always the reduced one.

While the embodiments of the present invention as herein disclosed constitute preferred forms, it is to be understood that other forms might be adopted.

What is claimed is as follows:

1. A rotor assembly for a dynamoelectric machine or the like comprising, a shaft, a field coil assembly carried by said shaft, first and second rotor segments carried by said shaft having interfitting pole teeth, each of said pole teeth having an outer surface defined by first and second sections, each outer surface being generally V-shaped, said first section being defined by a part of a cylinder having a constant radius and located at the leading edge of said teeth, said second section being defined by a shape having a circumferentially extending non-circular arc which curves in at an increasing rate toward the longitudinal axis of a respective rotor segment and located at the trailing edge of said teeth.

2. A rotor for a dynamoelectric machine comprising, a shaft, first and second rotor segments carried by said shaft having interfitting axially extending pole teeth, a field coil assembly carried by said shaft for magnetizing said pole teeth, each of said pole teeth having outer surfaces defined by first and second sections, said first sections being located adjacent the leading edge of the teeth and said second sections being located adjacent the trailing edge of the teeth, the periphery of each of said first sections being defined by an arc of a circle which has a constant radius the center of which coincides with the longitudinal axis of the shaft, the periphery of each of said second sections being defined by a curve having a non-circular arc which curves toward the longitudinal axis of the shaft at an increasing rate.

3. A rotor for a dynamoelectric machine comprising, a shaft, a field coil assembly carried by said shaft, first and second rotor segments carried by said shaft having interfitting pole teeth, said pole teeth having outer surfaces defined by first and second sections, said pole teeth being generally V-shaped, said first section of said pole teeth being defined by an arc of a circle having a constant radius the center of which substantially coincides with the longitudinal axis of the shaft having a non-circular arc, said second section being defined by a shape which curves inwardly at an increasing rate toward the longitudinal axis of the shaft, the side walls of said pole teeth being tapered inwardly, said first section being located at the leading edge of said pole teeth, said second section being located at the trailing edge of said pole teeth.

4. A dynamoelectric machine comprising, a stator assembly including stator laminations having an inner surface, said surface being annular and of a substantially constant diameter with the exception of stator slots, a rotor member rotatable with respect to said stator inner surface having rotor segments, said rotor segments having interfitting axially extending pole teeth the outer surface of which swings past the inner surface of said stator assembly, the outer surfaces of said pole teeth being so constructed and arranged that a substantially uniform air gap is maintained between a first area of said outer surfaces and the inner surface of said stator and a varying air gap is maintained between an adjacent second area of said outer surfaces on said pole teeth and the inner surface of said stator, the longitudinal axis of said rotor segments coinciding substantially with the longitudinal axis of said stator, said first area being located at the leading edge of said pole teeth, said second area being located at the trailing edge of said pole teeth and being defined by a non-circular arc which curves away from said inner surface of said stator laminations at an increasing rate.

5. A rotor for dynamoelectric machine or the like comprising, a shaft, a field coil assembly supported by said shaft, first and second rotor segments supported by said shaft and including interfitting pole teeth, said pole teeth having first and second adjacent outer surfaces, said first outer surface extending part way along an imaginary cylindrical surface whose radius is measured from the longitudinal axis of a rotor segment, said second outer surface being defined by a non-circular arc which provides an increasing gap at an increasing rate when said gap is measured between said second outer surface and said imaginary cylinder, said first outer surface being located at the leading edge of said pole teeth, said second outer surface being located at the trailing edge of said teeth.

References Cited by the Examiner

UNITED STATES PATENTS

| | | | |
|---|---|---|---|
| 2,795,715 | 6/1957 | Gilchrist | 310—261 |
| 2,870,352 | 1/1959 | Williford | 310—162 |
| 3,004,181 | 10/1961 | Noddin | 310—263 |
| 3,054,916 | 8/1962 | Cobb | 310—164 |
| 3,156,839 | 11/1964 | Wargo | 310—164 X |
| 3,184,625 | 5/1965 | Farison | 310—60 X |

MILTON O. HIRSHFIELD, *Primary Examiner.*

ORIS L. RADER, *Examiner.*

R. COOKE, J. J. SWARTZ, *Assistant Examiners.*

UNITED STATES PATENT OFFICE
CERTIFICATE OF CORRECTION

Patent No. 3,271,606　　　　　　　　　　　　September 6, 1966

George C. Collins

It is hereby certified that error appears in the above numbered patent requiring correction and that the said Letters Patent should read as corrected below.

Column 4, lines 14 and 15, strike out "having a non-circular arc" and insert same after "shape" in line 15, same column 4.

Signed and sealed this 29th day of August 1967.

(SEAL)
Attest:

ERNEST W. SWIDER
Attesting Officer

EDWARD J. BRENNER
Commissioner of Patents